(12) United States Patent
Hilty et al.

(10) Patent No.: US 12,365,163 B2
(45) Date of Patent: Jul. 22, 2025

(54) NANOSTRUCTURED PALLADIUM-BASED ALLOYS AND RELATED METHODS

(71) Applicant: Xtalic Corporation, Marlborough, MA (US)

(72) Inventors: Robert D. Hilty, Walpole, MA (US);
Evgeniya Freydina, Acton, MA (US);
Marina Kaufman, Brookline, MA (US)

(73) Assignee: Xtalic Corporation, Marlborough, MA (US)

( * ) Notice: Subject to any disclaimer, the term of this patent is extended or adjusted under 35 U.S.C. 154(b) by 0 days.

(21) Appl. No.: 17/204,455

(22) Filed: Mar. 17, 2021

(65) Prior Publication Data

US 2021/0291491 A1    Sep. 23, 2021

Related U.S. Application Data

(60) Provisional application No. 62/991,528, filed on Mar. 18, 2020.

(51) Int. Cl.
| | | |
|---|---|---|
| *B32B 15/01* | (2006.01) | |
| *C25D 5/00* | (2006.01) | |
| *C25D 7/00* | (2006.01) | |
| *H01B 1/02* | (2006.01) | |

(52) U.S. Cl.
CPC ............ *B32B 15/018* (2013.01); *C25D 5/617* (2020.08); *C25D 7/00* (2013.01); *H01B 1/02* (2013.01); *Y10T 428/12875* (2015.01)

(58) Field of Classification Search
None
See application file for complete search history.

(56) References Cited

U.S. PATENT DOCUMENTS

| | | | |
|---|---|---|---|
| 4,895,771 A | 1/1990 | Souter et al. | |
| 5,066,550 A | 11/1991 | Horibe et al. | |
| 5,129,143 A | 7/1992 | Wei et al. | |
| 9,765,438 B2 | 9/2017 | Cahalen et al. | |
| 10,763,000 B1 * | 9/2020 | Argibay | C23C 30/00 |
| 11,634,831 B2 | 4/2023 | Cahalen et al. | |
| 2011/0008646 A1 * | 1/2011 | Cahalen | B32B 15/043 |
| | | | 205/176 |
| 2012/0328904 A1 * | 12/2012 | Baskin | C25D 5/12 |
| | | | 977/773 |
| 2017/0253008 A1 * | 9/2017 | Cahalen | C25D 5/623 |

(Continued)

FOREIGN PATENT DOCUMENTS

| | | |
|---|---|---|
| EP | 0 701 281 A2 | 3/1996 |
| SU | 476332 A1 | 7/1975 |
| SU | 535378 A1 | 11/1976 |

OTHER PUBLICATIONS

International Search Report and Written Opinion for International Application No. PCT/US2021/022769 dated May 27, 2021.

(Continued)

*Primary Examiner* — Seth Dumbris
(74) *Attorney, Agent, or Firm* — Wolf, Greenfield & Sacks, P.C.

(57) ABSTRACT

Articles including a multi-layer electrical contact and methods for applying the contact to a substrate are described herein. The article may include a substrate on which the multi-layer electrical contact is formed. In some embodiments, the electrical contact includes multiple metallic layers.

10 Claims, 3 Drawing Sheets

(56) References Cited

U.S. PATENT DOCUMENTS

2019/0234994 A1    8/2019   Endo
2020/0076232 A1    3/2020   Woo et al.

OTHER PUBLICATIONS

International Preliminary Report on Patentability (Chapter 1) for International Application No. PCT/US2021/022769 dated Sep. 29, 2022.

\* cited by examiner

Anode and cathode spacing jig

NANOSTRUCTURED PALLADIUM-BASED ALLOYS AND RELATED METHODS

RELATED APPLICATIONS

This application claims priority to U.S. Provisional Application No. 62/991,528, filed Mar. 18, 2020, which is incorporated herein by reference in its entirety.

TECHNICAL FIELD

Articles and methods for providing palladium-based alloys for electrical contacts are generally described.

BACKGROUND

Metal alloys find many uses in the design and fabrication of articles. Such articles may be used in a variety of applications including in the electronics space such as electrical connectors. Different applications may have different performance/property requirements. For example, for certain electrical connector applications, properties such as hardness, ductility, electrical resistivity and corrosion resistance may be important. The composition and structure of alloys may be designed to provide certain property enhancements.

SUMMARY

Articles and methods described herein can use nickel-tungsten alloys and palladium-based alloys to form electrical contacts between materials.

In one aspect, an article for providing electrical contact is described, the article comprising a substrate; a first layer over the substrate; and a second layer over the to the substrate, wherein the first layer comprises a nanocrystalline nickel-tungsten alloy, and wherein the second layer comprises a nanocrystalline palladium-based alloy comprising a second metal.

In another aspect, an article for providing electrical contact is described, the article comprising a substrate, a first layer over the substrate, and a second layer over to substrate, wherein the first layer comprises a nanocrystalline nickel-tungsten alloy, wherein the second layer comprises a nanocrystalline palladium-based alloy comprising a second metal, and wherein a low-level contact resistance of the article is no greater than 10 mOhm.

In a different aspect, a method of fabricating an electrical contact, the method comprising providing a substrate; electrodepositing a nanocrystalline nickel-tungsten over the substrate; electrodepositing a metallic layer over the substrate; and electrodepositing a nanocrystalline palladium-based alloy comprising a second metal over the substrate.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1C:
FIGS. 1A-1C schematically depict stack configurations for three electrical contacts comprising nickel-tungsten (XT) and a palladium-based alloy, according to one set of embodiments.

Articles (e.g., electrical contacts, coatings) including a palladium-based alloy on a substrate and methods for applying palladium-based alloy coatings for electrical contacts are described. The article may include a substrate on which the palladium-based alloy is formed. The palladium-based alloy can be a nanocrystalline palladium-based alloy. In some embodiments, articles includes multiple layers (e.g., a palladium-based alloy layer, a first layer, a second layer, a metallic layer). For example, the electrical contact may include at least two layers each having a different composition. One layer (e.g., a first layer) can comprise a nickel-tungsten alloy and another layer (e.g., a second layer) can comprise a palladium-based alloy. In some embodiments, the article includes at least four layers (e.g., palladium-based alloy layers, nickel-tungsten layers, metallic layers). In general, a metallic layer comprises one (e.g., only one) or more metal(s). In some cases, at least some (e.g., all) of the layers of the article can be applied using an electrodeposition process. As described further below, articles including a multi-layer electrical contact can exhibit desirable properties and characteristics including, for example, exceptional immersion corrosion properties, and low-level contact resistance (LLCR) below a particular threshold. The articles may be used in a variety of applications including in electrical and/or electronic applications such as electrical connectors.

The articles described above and elsewhere herein can improve connector coating finishes and reduce or eliminate the use of other metals (e.g., rhodium). Palladium-based alloys can boost electrical contact performance with respect to key performance indicators, such as wear durability, powered immersion corrosion performance, salt spray endurance, heat age tolerance and industrial mixed flowing gas corrosion resistance. The nanostructured palladium-based alloys described herein have improved hardness and strength over pure palladium. Unique features of the disclosed alloy systems are improved hardness, reduced crystallite size, and more favorable performance in corrosion testing, namely in salt spray (ASTM B117) and powered immersion corrosion.

Palladium-based alloys as described herein can include a second metal. The second metal included in the palladium-based alloy can comprise Sb, Re, Co, Ir, Os, Pt, Rh, Ru, W, and/or Sn. In some embodiment, the palladium-based alloy is a palladium-antimony alloy (Pd—Sb) and can demonstrate some of the above described unique features. However, in other embodiments, other palladium-based alloys can be prepared and can also be nanostructured. Various alloy concentrations of antimony were added to the palladium base with variations from 3 to 33 at %. The resulting alloy is a supersaturated solid solution with the palladium crystal structure. These alloys can be nanocrystalline. In some embodiments, palladium-based alloys comprising antimony as the second metal can show hardness greater than 600 HV. Reciprocating wear durability testing of Pd—Sb mated to Pd—Sb (cap on flat geometry) produced greater than 10,000 cycles of wear durability (50 fG with 3 mm oscillating wipe, 0.25 Hz) with the Pd—Sb layer remaining intact.

As described above, the palladium-based alloy comprising antimony as a second metal can comprise a high antimony content (25-35 wt. %). Antimony addition to the palladium-based alloy can reduce the crystallite size, and greatly improving hardness and wear resistance of the alloy. Lower antimony concentrations (up to 10 wt. %) in the palladium-based alloy also improve the hardness, however the electroplated coatings are usually highly stressed, requiring some additional measures to improve wear performance. The high-antimony palladium-based alloy can have a much lower stress as plated, can be deposited reasonably fast and can form thick films without cracking (e.g., without cracking for a film as thick as at least 30 µm). The low-stress Pd—Sb alloy performs well in the wear testing. Unexpectedly, the high-antimony palladium-based alloys can also display very good corrosion resistance, as demonstrated by the power immersion corrosion tests.

Palladium-based alloys comprising Re are also described (e.g., Pd—Re). Alloys can be relatively low in Re content, up to 3 at %. Higher concentrations of rhenium are possible using tools known by those skilled in the art. In some embodiments, the Pd—Re alloys are nanocrystalline and the resulting alloy is a supersaturated solid solution with the palladium crystal structure.

Palladium-based alloys (e.g., Pd—Sb, Pd—Re) described herein can be nanocrystalline. As used herein, a "nanocrystalline" structure refers to a structure in which the number-average size of crystalline grains (e.g., crystallites) is less than one micron. The number-average size of the crystalline grains provides equal statistical weight to each grain and is calculated as the sum of all spherical equivalent grain diameters divided by the total number of grains in a representative volume of the body. The number-average size of crystalline grains may, in some embodiments, be less than 200 nm, less than 100 nm, less than 50 nm, less than 25 nm, and/or less than 10 nm. In some embodiments, the number-average size of crystalline grains may be greater than 1 nm, greater than 5 nm, greater than 10 nm and/or greater than 25 nm. It should be understood that all suitable combinations of the above-noted ranges are possible (e.g., between 5 nm and 100 nm, between 10 nm and 50 nm, between 15 nm and 35 nm and the like).

Figure 1B:
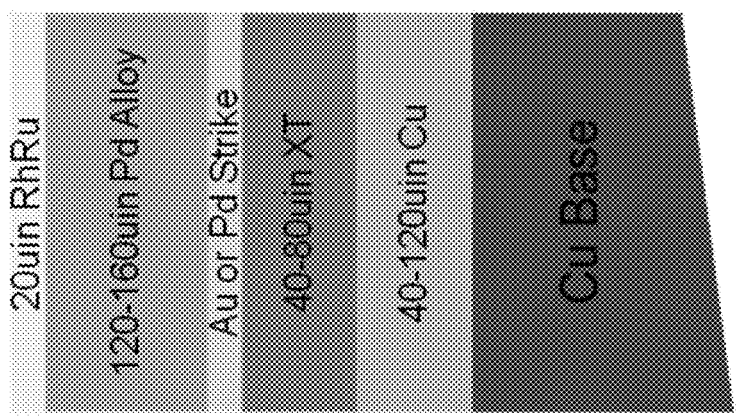

Palladium-based alloys (e.g., Pb—Sb) can be used alone as a coating or as part of a stack of multiple plating layers. In some embodiments, the palladium-based alloys can be used as or as part of an electrical contact. For example, referring now to FIG. 1A, an electrical contact comprises a palladium-based alloy as a "Pd Alloy" layer 120-160 µm in thickness. In some embodiments, the palladium-based alloy can be plated directly onto nickel or a nickel alloy. By using the palladium-based alloys as described herein, alternate plating layer stacks are advantageous, especially from the perspective of reducing the overall use of rhodium alloys as used in certain existing systems and reducing the overall cost. For example, FIG. 1B schematically illustrates using only one layer of a rhodium alloy compared to FIG. 1A. Further, FIG. 1C schematically illustrates the absence of rhodium alloy when compared to FIGS. 1A and 1B. However, other stack configurations are possible and those skilled in the art are capable of configuring stack orientations for a particular use.

Figure 1A:
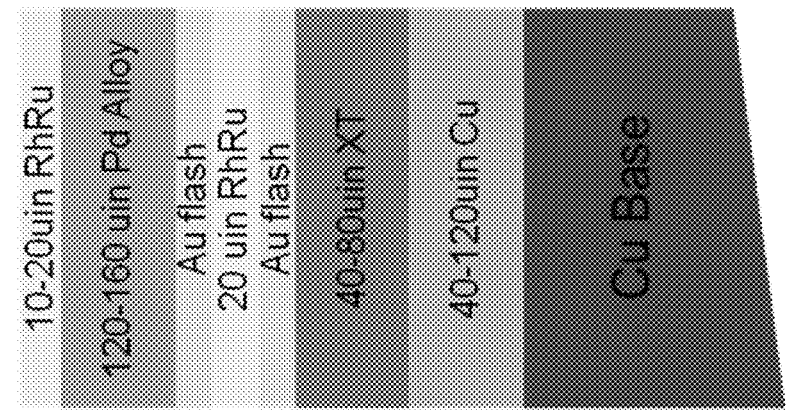

As described above, the palladium-based alloy can be used as a stack in a multi-layer stack. Referring now to FIG. 1A, a substrate (e.g., a Cu-base substrate) can have a palladium-based alloy over the substrate as a first layer (e.g., 120-180 uin Pd-Alloy). The substrate can also have a nickel-based alloy (e.g., 40-80 uin XT layer) over the substrate. In some embodiments, optional metallic layers can also be over the substrate. For example, in FIG. 1A, the substrate has an optional metallic layer of copper (e.g., 40-120 uin Cu) directly adjacent to the substrate. A strike layer or a flash layer, such as a Au flash layer can be in between the palladium-based alloy layer, as shown in the figure, in addition to another metallic layer, such a RhRu layer. In some embodiments, use of the palladium-based alloy can circumvent the use of certain metallic layers. For example, in FIG. 1B, only one metallic layer of RhRu appears, while the substrate, the palladium-based alloy, and the nickel-based alloy are still in present in the stack. In some embodiments, a stack comprises a substrate, an optional metallic layer adjacent the substrate, and a nickel-based alloy and palladium-based alloy over the substrate, as schematically illustrated in FIG. 1C. An optional strike or flash layer (e.g., Au or Pd strike layer) may be between the palladium-based alloy layer and the nickel-based alloy layer, as such a layer may promote adhesion between the two layers, as pictured in FIG. 1C. The above described stacks can be used as electrical contacts; however, other arrangements are possible, as described below and elsewhere herein.

As noted above, the articles described herein may include a substrate. A variety of different substrates may be suitable. In some cases, the substrate may comprise an electrically conductive material, such as a metal, metal alloy, intermetallic material, or the like. Suitable base materials include steel, stainless steel, copper and copper alloys (e.g. brass or bronze materials), aluminum and aluminum alloys, nickel and nickel alloys, polymers with conductive surfaces and/or surface treatments, and transparent conductive oxides, amongst others. In some embodiments, copper base materials are preferred. In some embodiments, the substrate may be formed substantially of one material (e.g., a single material layer or a bulk material). In other embodiments, the substrate is formed of more than one layer of different materials.

The substrate may be in the form of a variety of shapes and dimensions. For example, the substrate may be a strip. In some cases, the substrate may be perforated. In some cases, the substrate may be a discrete component.

The multi-layer coating can be formed on the substrate. In some cases, the coating (e.g., a layer, a metallic layer, a nanocrystalline nickel-tungsten layer, a nanocrystalline palladium-based alloy layer) covers substantially the entire outer surface area of the substrate. In some cases, the coating only covers a portion of the outer surface area of the substrate. For example, the coating may only cover one outer surface of the substrate. In some cases, portions of the substrate may be masked when forming the coating so that the coating is formed selectively on certain portions of the substrate while leaving other portions of the substrate uncoated. In some embodiments, one or more layers of the coating may be selectively deposited (e.g., using a mask)

when being formed. That is, one or more layers (e.g., a metal layer such as Au or Rh) may cover only a portion of the outer surface area of the underlying layer or substrate.

A first layer can be an optional metallic layer, such as a copper layer over the substrate. For example, as shown in FIG. 1B, an optional metallic layer (e.g. 40-120 uin Cu) can be directly on Cu base substrate. In some embodiments, an additional optional metallic layer can be coated directly on the optional metallic layer, such a nickel-based layer, such as the XT layer schematically depicted in FIG. 1B. Next, an optional flash or strike layer may be directly adjacent to the nickel-based layer, followed by a palladium-based alloy layer, as in FIG. 1B. Other layers may be adjacent to the palladium-based alloy layer, such as a RhRu alloy layer as shown in FIG. 1B.

In some cases, the first metallic layer comprises nickel. The nickel may be in the form of nickel metal (e.g., substantially pure metal). In some cases, the first metallic layer comprises a nickel-based alloy. In some cases, the nickel-alloy further comprises tungsten and/or molybdenum (e.g., a nickel-tungsten alloy, a nickel-molybdenum alloy, a nickel-tungsten-molybdenum alloy). The nickel alloy may be in the form of a solid solution. Other nickel alloys may also be employed. For example, the nickel alloy may further comprise cobalt, phosphorus, and/or palladium. In some cases, the weight percent of nickel in the alloy may be between 25-85 weight percent; and, in some cases, between 50 and 80 weight percent. In these cases, the remainder of the alloy may be tungsten and/or molybdenum. Other weight percentages outside of this range may be used as well. For example, in some embodiments and for certain applications, the weight percent of tungsten in the alloy may be greater than or equal to 10 weight percent; in some cases, greater than or equal to 14 weight percent; in some cases, greater than or equal to 15 weight percent; and, in some cases greater than or equal to 20 weight percent. In some cases, the total weight percentage of tungsten in the alloy is less than or equal to 50 weight percent; in some cases, the total weight percentage of tungsten in the alloy is less than or equal to 45 weight percent; in some cases, the total weight percentage of tungsten in the alloy is less than or equal to 40 weight percent; in some cases, the total weight percentage of tungsten in the alloy is less than or equal to 35 weight percent; in some cases, the total weight percentage of tungsten in the alloy is less than or equal to 30 weight percent; and, in some cases, the total weight percentage of tungsten in the alloy is less than or equal to 20 weight percent.

In some cases, the first metallic layer may have a particular microstructure. For example, the first metallic layer may have a nanocrystalline microstructure. As used herein, a "nanocrystalline" structure refers to a structure in which the number-average size of crystalline grains is less than one micron. The number-average size of the crystalline grains provides equal statistical weight to each grain and is calculated as the sum of all spherical equivalent grain diameters divided by the total number of grains in a representative volume of the body. The number-average size of crystalline grains may, in some embodiments, be less than 200 nm, less than 100 nm, less than 50 nm, less than 25 nm, and/or less than 10 nm. In some embodiments, the number-average size of crystalline grains may be greater than 1 nm, greater than 5 nm, greater than 10 nm and/or greater than 25 nm. It should be understood that all suitable combinations of the above-noted ranges are possible (e.g., between 5 nm and 100 nm, between 10 nm and 50 nm, between 15 nm and 35 nm and the like). In some embodiments, the first metallic layer may have an amorphous structure. As known in the art, an amorphous structure is a non-crystalline structure characterized by having no long-range symmetry in the atomic positions. Examples of amorphous structures include glass, or glass-like structures.

In some embodiments, the first metallic layer may have a thickness of greater than 0.1 microns, greater than 0.25 microns, greater than 0.5 microns, greater than 1.0 microns and/or greater than 2.0 microns. In some embodiments, the thickness is less than 20.0 microns, less than 10.0 microns, less than 5.0 microns, less than 3.0 microns, less than 2.0 microns, less than 1.0 micron and/or less than 0.5 micron. It should be understood that all suitable combinations of the above-noted ranges are possible (e.g., between 0.1 and 5.0 microns; between 0.25 and 3.0 microns; between 0.5 and 2.0 microns, and the like).

The second layer of the coating may be a metallic layer. In some embodiments, the second layer is formed over the substrate. In some embodiments, the second layer is formed directly on the first layer. In other embodiments, an intervening layer is formed between the first layer and the metallic layer. For example, an intervening strike layer (e.g., comprising Pd and/or Au) may be formed between the first layer and the second layer for a variety of purposes, for example, to enhance adhesion.

The second layer comprises a palladium-based alloy. The palladium-based alloy can comprise a second metal (i.e., a metal distinct from palladium). In some embodiments, the palladium-based alloy comprises palladium-antimony. In some embodiments, the palladium-based alloy comprises palladium-rhenium. The palladium-based alloy may be in the form of palladium metal (e.g., substantially pure metal). The palladium-based alloy may be in the form of a solid solution. In some embodiments, it is preferable for the second layer to comprise a palladium-antimony alloy. Other palladium alloys may also be employed. In some embodiments, the weight percent of palladium and/or rhenium in the palladium-based alloy (e.g., the remainder being substantially pallidum) may be at least at least 25 weight percent, at least 30 weight percent or at least 35 weight percent. In some embodiments, the weight percent of antimony and/or rhenium in the palladium-based alloy (e.g., the remainder being substantially palladium) may be less than 35 weight percent, less than 30 weight percent, or less than 25 weight percent. It should be understood that all suitable combinations of the above-noted ranges are possible (e.g., between 25 and 30 weight percent; between 25 and 35 weight percent; between 30 and 35 and the like). Other weight percentages outside of this range may be used as well.

The concentration of the second metal (e.g., antimony and/or rhenium) can also be described in atomic percentages (i.e., at %). In some embodiments, the concentration of the second metal in the palladium alloy (e.g., the remainder being substantially palladium) is at least 3 at %, at least 5 at %, at least 10 at %, at least 15 at %, at least 20 at %, at least 25 at %, at least 30 at %, or at least 33 at %. In some embodiments, the concentration of the second metal in the palladium alloy is no greater than 33 at %, no greater than 30 at %, no greater than 25 at %, no greater than 20 at %, no greater than 15 at %, no greater than 10 at %, no greater than 5 at %, or no greater than 3 at %. Combinations of the above-referenced ranges are possible (e.g., at least 3 at % and no greater than 33 at %). Other ranges are possible.

In some cases, the second layer may have a particular microstructure. For example, the second metallic layer may have a nanocrystalline microstructure. The number-average size of crystalline grains (e.g., crystallites) may, in some embodiments, be less than 200 nm, less than 100 nm, less than 50 nm, less than 25 nm, less than 10 nm and/or less than 5 nm. In some embodiments, the number-average size of crystalline grains may be greater than 1 nm, greater than 5 nm, greater than 10 nm and/or greater than 25 nm. It should be understood that all suitable combinations of the above-noted ranges are possible (e.g., between 5 nm and 100 nm, between 10 nm and 50 nm, between 15 nm and 35 nm and the like). In some embodiments, the second layer may have an amorphous structure.

In some embodiments, the second layer may have a thickness of greater than 0.01 microns, greater than 0.1 microns, greater than 0.25 microns, greater than 0.5 microns, and/or greater than 1.0 microns. In some embodiments, the thickness is less than 25.0 microns, less than 10.0 microns, less than 5.0 microns, less than 2.5 microns, less than 1.0 microns and/or less than 0.5 microns. It should be understood that all suitable combinations of the above-noted ranges are possible (e.g., between 0.1 and 10.0 microns; between 0.25 and 5.0 microns; between 0.5 and 3.0 microns and the like). A third layer of the electrical contact may be a metallic layer. In some embodiments, the third metallic layer is formed directly on the second layer. In other embodiments, an intervening layer is formed between the second layer and the third layer.

In some embodiments, a third layer is present. The third layer may be a metallic layer. In some embodiments, the third layer comprises one or more precious metals. Examples of suitable precious metals include Ru, Rh, Os, Ir, Pd, Pt, Ag, and/or Au. In some embodiments, the precious metal is selected from the group consisting Ru, Os, Ir, Pd, Pt, Ag, and Au, or combinations thereof. Gold may be preferred in some embodiments. Palladium may be preferred in some embodiments. Au may be preferred in some embodiments. In some embodiments, the metal layer consists essentially of one precious metal. In some cases, the precious metal is not rhodium and/or is not ruthenium. In other cases, the metal layer may comprise an alloy that includes at least one precious metal and at least one other metal. The other metal may be selected from Ni, W, Fe, B, S, Co, Mo, Cu, Cr, Zn, and Sn, amongst others.

In some cases, the third layer may have a particular microstructure. For example, the third layer may have a nanocrystalline microstructure. The number-average size of crystalline grains may, in some embodiments, be less than 200 nm, less than 100 nm, less than 50 nm, less than 25 nm, and/or less than 10 nm. In some embodiments, the number-average size of crystalline grains may be greater than 1 nm, greater than 5 nm, greater than 10 nm and/or greater than 25 nm. It should be understood that all suitable combinations of the above-noted ranges are possible (e.g., between 5 nm and 100 nm, between 10 nm and 50 nm, between 15 nm and 35 nm and the like). In some embodiments, the third layer may have an amorphous structure.

In some embodiments, the third layer may have a thickness of greater than 0.01 microns, greater than 0.05 microns, greater than 0.1 microns, greater than 0.25 microns, greater than 0.5 microns, greater than 1.0 microns and/or greater than 5.0 microns. In some embodiments, the thickness is less than 10.0 microns, less than 5.0 microns, less than 2.0 microns, less than 1.0 microns, less than 0.5 microns, less than 0.25 microns and/or less than 0.1 microns. It should be understood that all suitable combinations of the above-noted ranges are possible (e.g., between 0.05 and 5.0 microns; between 0.1 microns and 3.0 microns; between 0.1 and 2.0 microns; between 0.25 microns and 0.75 microns, and the like).

In some embodiments, the article (e.g., an electrical contact, a coating) may include a fourth layer. However, it should be understood that in other embodiments a fourth layer may not be present. The fourth layer of the article may be a metallic layer. In some embodiments, the fourth metallic layer is formed directly on the third metallic layer. In other embodiments, an intervening layer is formed between the third metallic layer and the fourth metallic layer.

In some embodiments, the fourth layer comprises a platinum group metal (e.g., group 10, ruthenium, rhodium, palladium, osmium, iridium, and/or platinum). In some cases, it may be preferable for the platinum group metal to be rhodium. It has been observed that particularly attractive properties (e.g., immersion corrosion) are achievable when the fourth metallic layer comprises rhodium. Rhodium may be in the form of rhodium metal (e.g., substantially pure). In some cases, rhodium may be in the form of an alloy along with one or more other metals (e.g., precious metals). Other compositions may also be suitable for the fourth metallic layer In some cases, the fourth layer (e.g., a fourth metallic layer) may have a particular microstructure. For example, the fourth metallic layer may have a nanocrystalline microstructure. The number-average size of crystalline grains may, in some embodiments, be less than 200 nm, less than 100 nm, less than 50 nm, less than 25 nm, and/or less than 10 nm. In some embodiments, the number-average size of crystalline grains may be greater than 1 nm, greater than 5 nm, greater than 10 nm and/or greater than 25 nm. It should be understood that all suitable combinations of the above-noted ranges are possible (e.g., between 5 nm and 100 nm, between 10 nm and 50 nm, between 15 nm and 35 nm and the like). In some embodiments, the fourth metallic layer may have an amorphous structure.

In some embodiments, the fourth layer may have a thickness of greater than 0.01 microns, greater than 0.05 microns, greater than 0.1 microns, greater than 0.25 microns, greater than 0.5 microns, greater than 1.0 microns and/or greater than 2.5 microns. In some embodiments, the thickness is less than 10.0 microns, less than 5.0 microns, less than 2.0 microns, less than 1.0 microns, less than 0.5 microns, less than 0.25 microns and/or less than 0.1 microns. It should be understood that all suitable combinations of the above-noted ranges are possible (e.g., between 0.01 and 10.0 microns; between 0.05 and 5.0 microns; between 0.05 and 2.0 microns; or between 0.1 microns and 0.5 microns, and the like).

In some embodiments, the electrical contact includes a first layer comprising nickel (e.g., a nickel-tungsten alloy), a second layer comprising palladium (e.g., a palladium-antimony alloy). In some embodiments, the electrical contact further includes a third layer (e.g., a strike layer, a flash layer) comprising gold and/or palladium and a fourth layer (e.g., a fourth layer comprising rhodium and/or ruthenium). This arrangement of layers unexpectedly exhibits particularly exceptional properties including exceptional immersion corrosion properties (e.g., with or without an applied bias). Other particularly exceptional properties can include desirable coloration (e.g., desired shade/tone, color stability over time, etc.), excellent wear resistance, and a stable surface conductivity (e.g., a contact resistance that differs by less than 1 ohm, less than 100 m-ohm, less than 50 m-ohm, less than 25 m-ohm, and/or less than 10 m-ohm over testing as measured by EIA 364 Test Protocol).

It should be understood that the article (e.g., an electrical contact) may include any combination of the above-described layers. For example, the article may comprise a palladium-based alloy (e.g., a nanocrystalline palladium-based alloy) followed by a nickel-based alloy (e.g., a nanocrystalline nickel-tungsten alloy) or may include a nickel-based alloy, a strike layer (e.g., Au), followed by a palladium-base alloy layer. Also, it should be understood that the electrical contact may include more than four layers (e.g., a fifth layer, a sixth layer, a seventh layer, and so forth) and more than four metallic layers. However, in some embodiments, the electrical may only include four layers In some embodiments, the electrical may include less than four layers (e.g., one or two of the first layer, second layer, and third metallic layer(s) described above may not be present). In some embodiments, the electrical contact may include only two layers, such as a palladium-based alloy layer and a nickel-based alloy layer. For example, the coating may include the above-described fourth layer and one (or more) of the other layers (e.g., first layer, second layer and/or third layer).

As noted above, layers of the electrical contacts may be formed using an electrodeposition process. Electrodeposition generally involves the deposition of a material (e.g., electroplate) on a substrate by contacting the substrate with an electrodeposition bath and flowing electrical current between two electrodes through the electrodeposition bath, i.e., due to a difference in electrical potential between the two electrodes. For example, methods described herein may involve providing an anode, a cathode, an electrodeposition bath (also known as an electrodeposition fluid) associated with (e.g., in contact with) the anode and cathode, and a power supply connected to the anode and cathode. In some cases, the power supply may be driven to generate a waveform for producing a coating, as described more fully below.

Generally, the different layers (e.g., metallic layers) may be applied using separate electrodeposition baths. In some cases, individual articles (e.g., a substrate, an electrical contact) may be connected such that they can be sequentially exposed to separate electrodeposition baths, for example in a reel-to-reel process. For instance, articles may be connected to a common conductive substrate (e.g., a strip). In some embodiments, each of the electrodeposition baths may be associated with separate anodes and the interconnected individual articles may be commonly connected to a cathode.

The electrodeposition process(es) may be modulated by varying the potential that is applied between the electrodes (e.g., potential control or voltage control), or by varying the current or current density that is allowed to flow (e.g., current or current density control). In some embodiments, the coating may be formed (e.g., electrodeposited) using direct current (DC) plating, pulsed current plating, reverse pulse current plating, or combinations thereof. In some embodiments, reverse pulse plating may be preferred, for example, to form the barrier layer (e.g., nickel-tungsten alloy). Pulses, oscillations, and/or other variations in voltage, potential, current, and/or current density, may also be incorporated during the electrodeposition process, as described more fully below. For example, pulses of controlled voltage may be alternated with pulses of controlled current or current density. In general, during an electrodeposition process an electrical potential may exist on the substrate (e.g., base material) to be coated, and changes in applied voltage, current, or current density may result in changes to the electrical potential on the substrate. In some cases, the electrodeposition process may include the use waveforms comprising one or more segments, wherein each segment involves a particular set of electrodeposition conditions (e.g., current density, current duration, electrodeposition bath temperature, etc.), as described more fully below.

Some embodiments of the invention involve electrodeposition methods wherein the grain size of electrodeposited materials (e.g., metals, alloys, and the like) may be controlled. In some embodiments, selection of a particular coating (e.g., electroplate) composition, such as the composition of an alloy deposit, may provide a coating having a desired grain size. In some embodiments, electrodeposition methods (e.g., electrodeposition conditions) described herein may be selected to produce a particular composition, thereby controlling the grain size of the deposited material.

In some embodiments, a coating, an electrical contact, or portion thereof, may be electrodeposited using direct current (DC) plating. For example, a substrate (e.g., electrode) may be positioned in contact with (e.g., immersed within) an electrodeposition bath comprising one or more species to be deposited on the substrate. A constant, steady electrical current may be passed through the electrodeposition bath to produce a coating, or portion thereof, on the substrate. In some embodiments, the potential that is applied between the electrodes (e.g., potential control or voltage control) and/or the current or current density that is allowed to flow (e.g., current or current density control) may be varied. For example, pulses, oscillations, and/or other variations in voltage, potential, current, and/or current density, may be incorporated during the electrodeposition process. In some embodiments, pulses of controlled voltage may be alternated with pulses of controlled current or current density. In some embodiments, the coating may be formed (e.g., electrodeposited) using pulsed current electrodeposition, reverse pulse current electrodeposition, or combinations thereof.

In some cases, a bipolar waveform may be used, comprising at least one forward pulse and at least one reverse pulse, i.e., a "reverse pulse sequence." In some embodiments, the at least one reverse pulse immediately follows the at least one forward pulse. In some embodiments, the at least one forward pulse immediately follows the at least one reverse pulse. In some cases, the bipolar waveform includes multiple forward pulses and reverse pulses. Some embodiments may include a bipolar waveform comprising multiple forward pulses and reverse pulses, each pulse having a specific current density and duration. In some cases, the use of a reverse pulse sequence may allow for modulation of composition and/or grain size of the coating that is produced.

It should be understood that other techniques may be used to produce articles (e.g., electrical contacts) as described herein, including without limitation electroless plating processes, vapor-phase processes, (e.g. physical vapor deposition, chemical vapor deposition, ion vapor deposition, etc.), sputtering, spray coating, powder-based processes, slurry-based processes, etc.

As noted above, articles including the multi-layer coating can exhibit desirable properties and characteristics including, for example, exceptional immersion corrosion properties. The immersion corrosion properties described herein can be measured in a three electrode temperature-controlled jacketed cell at 22° C. The cell includes a platinum wire as a counter electrode and a Ag/AgCl reference electrode in a saturated KCl solution. The sample (e.g., coated article) is immersed in a testing solution such as artificial perspiration (e.g., artificial perspiration manufactured according to ISO 3160) and a positive bias (e.g., 5 Volts) is applied to the sample. The time to failure (e.g., in minutes) is measured.

There are several types of failure that may be characterized in different ways. As used herein, the time to "initial visible failure" is defined as the test time until the first visible signs of corrosion on the sample to the naked eye.

As used herein, the time to "functional failure" is the test time until a connector formed from the sample no longer functions as defined by its mating surface having an LLCR (low-level contact resistance) of greater than 50 mOhm when measured according to EIA-364-23B. In some embodiments, functional failure may be the test time until the mating surface has an LLCR of greater than 100 mOhm; in some embodiments, an LLCR of greater than 250 mOhm; in some embodiments, an LLCR of greater than 1 Ohm; and, in some embodiments, an LLCR of greater than 10 Ohms when measured according to EIA-364-23B. In some embodiments, the time to functional failure is the test time until a connector formed from the sample no longer functions as defined by its mating surface having a change in LLCR of greater than or equal to 10 mOhm; in some embodiments, a change in LLCR of greater than 15 mOhm; in some embodiments, a change in LLCR of greater than 20 mOhm; in some embodiments, a change in LLCR of greater than 50 mOhm; in some embodiments, a change in LLCR of greater than 100 mOhm; in some embodiments, a change in LLCR of greater than 250 mOhm; and, in some embodiments, a change in LLCR of greater than 1 Ohm, when measured according to EIA-364-23B.

As used herein, the time to "distinct corrosion" failure may be defined as the test time until the first corrosion product of a size and location as described in EIA-364-53B "Nitric Acid Vapor Test, Gold Finish Test Procedure for Electrical Connectors and Sockets" has a frequency of greater than 2%; in some embodiments, greater than 10%; and in some embodiments greater than 15%.

Those of ordinary skill in the art will recognize that visible corrosion along the edges of the multi-layer coating are often caused by "edge effects" and are often discounted as signs of failure during a given test. Those of ordinary skill in the art will also recognize that local processing defects, incorrect cleaning or activation of the sample prior to layer synthesis, or mechanically or chemically damaging exposures of the multi-layer coating prior to testing could cause a given test to be invalid regardless of the failure type being evaluated.

The exceptional immersion corrosion properties of articles including a multi-layer electrical contact may be characterized by time(s) to failure in an immersion corrosion test. For example, in some embodiments, the time to failure (e.g., initial visible failure, functional failure and/or distinct corrosion failure) of the multi-layer coated articles is at least 5 minutes at 5 Volts in artificial perspiration; in some embodiments, at least 10 minutes at 5 Volts in artificial perspiration; in some embodiments, at least 20 minutes at 5 Volts in artificial perspiration; in some embodiments, at least 40 minutes at 5 Volts in artificial perspiration; in some embodiments, at least 80 minutes at 5 Volts in artificial perspiration; and, in some embodiments, at least 100 minutes at 5 Volts in artificial perspiration. In some embodiments, the time to initial visible failure is less than 360 minutes at 5 Volts in artificial perspiration, less than 240 minutes at 5 Volts in artificial perspiration or less than 120 minutes at 5 Volts in artificial perspiration The articles can be used in a variety of applications including electrical applications such as electrical connectors (e.g., plug-type). Non-limiting examples of electrical connectors include infrared connectors, data and/or power connectors (e.g., USB connectors), video connectors (e.g., HDMI connectors), audio connectors (e.g., 3.5 mm audio plug), battery chargers, battery contacts, automotive electrical connectors, etc.

The following examples are intended to illustrate certain embodiments of the present invention, but do not exemplify the full scope of the invention.

Example 1

The following example describes the preparation and characterization of a palladium-based alloy using antimony as the second metal, Pd—Sb.

Figure 2:
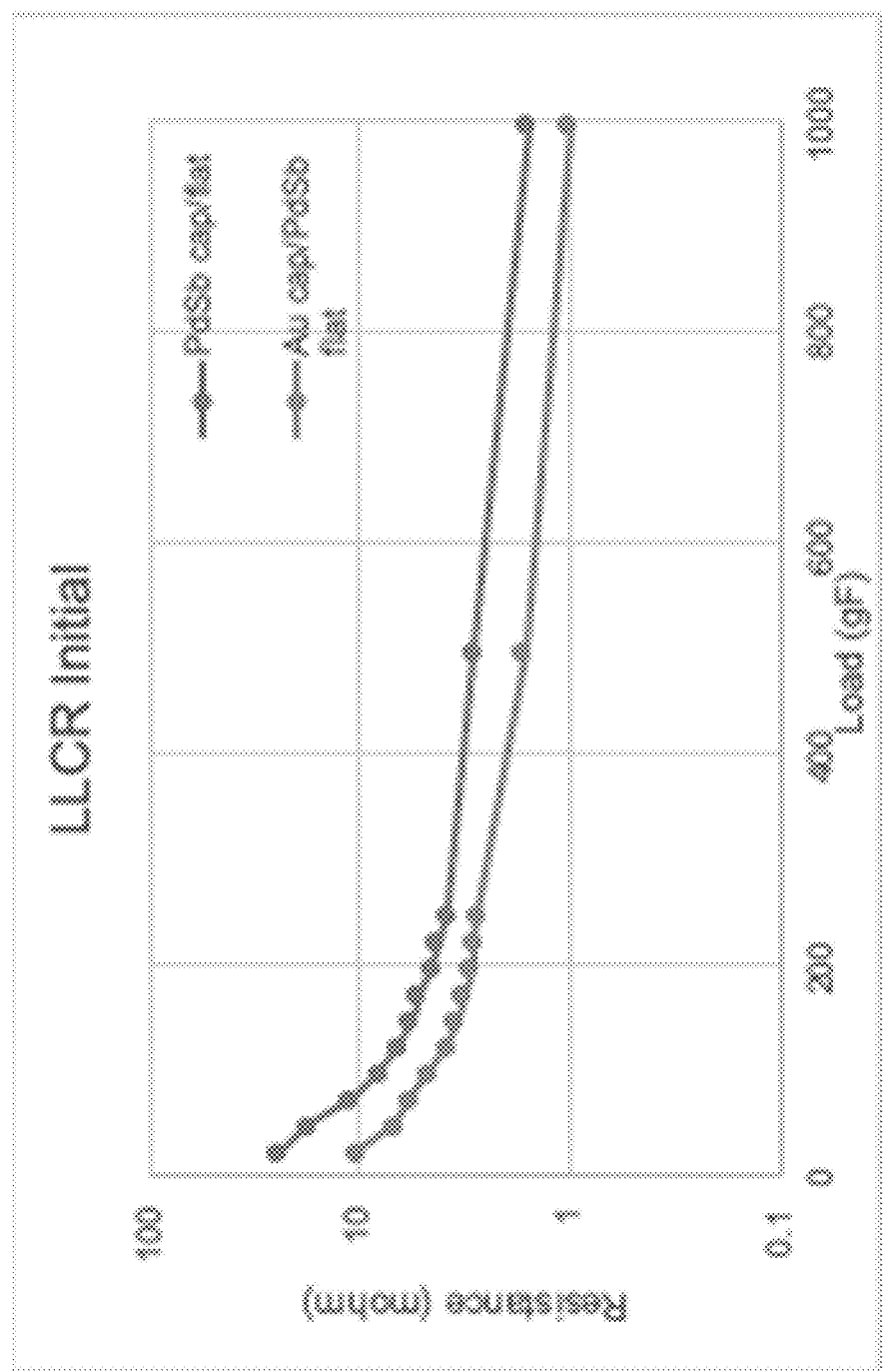
FIG. 2 is a plot of the initial low-level contract resistance (LLCR) of palladium-antimony alloy/palladium-antimony alloy capped electrical contact compared to palladium-antimony/gold-capped electrical contact, according to one set of embodiments.

Pd—Sb alloy was electroplated onto a strike layer of Pd over 2 m of nickel-tungsten over a base metal of copper alloy, C7025. The plating was deposited onto flat coupons and onto a "cap" which is a 1 mm hemispherical dome. The resulting samples were evaluated for low level contact resistance. The mating force was monotonically increased from 25 gF to 1000 gF with a plunger style contact probe without any wipe at the contact interface. Two configurations were tested: 1) PdSb alloy cap was mated to a similarly plated PdSb alloy flat coupon and 2) a cap plated with 0.75 µm of hard Au over 2 m of nickel tungsten, mated to a flat coupon plated with PdSb. The results on FIG. 2 show the low and stable contact resistance of these new coatings.

Various alloys of Pd—Sb were fabricated by electroplating onto copper substrates. Crystallite size was determined by X-ray diffraction. The samples were cross sectioned, and hardness was measured by Vickers hardness test. Antimony content was measured by XRF and is reported in Table 1 in weight percent.

TABLE 1

| Sample | Hardness (HV10) | wt % Sb by XRF | size (nm) |
|---|---|---|---|
| 1 | 568 | 29.3 | 10 |
| 2 | 658 | 28.2 | 11 |
| 3 | 415 | 15.9 | 6 |
| 4 | 324 | 22.2 | 7 |
| 5 | 442 | 7.9 | 7 |
| 6 | 403 | 8.1 | 8 |

Example 2

The following describes the preparation of a palladium-based alloy with rhenium as the second metal, Pd—Re.

Pd—Re alloys were electroplated onto copper substrates. The Re content can be varied by altering the plating conditions or Re content in the bath. The samples were cross sectioned, and hardness was measured by Vickers hardness test. Rhenium content was measured by SEM/EDS and is reported in Table 2 in atomic percent.

TABLE 2

| Sample | Hardness (HV10) | at % Re by EDS |
|---|---|---|
| 1 | 456 | 2.65 |
| 2 | 454 | 3.45 |

Figure 3:
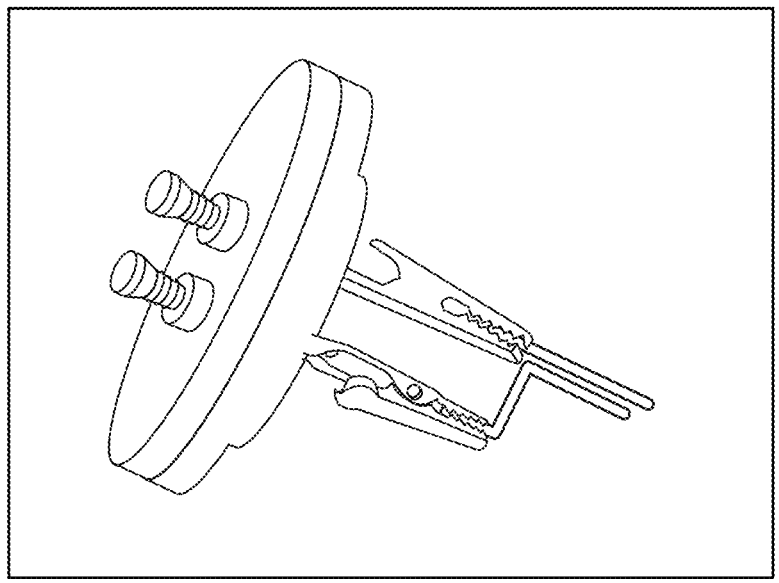
FIG. 3 shows a description of the power immersion corrosion test, according to some embodiments.
Figure 3:
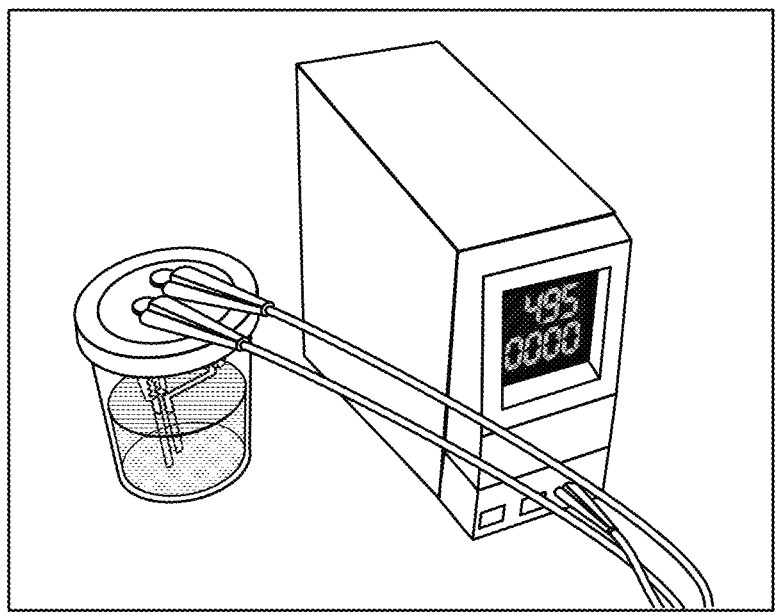

The Pd alloys demonstrate improved resistance to powered immersion corrosion compared to other Pd alloys, such as Pd—Ni and Pd—Co. The test method for powered immersion corrosion is shown in FIG. 3. Parts coated with Pd—Sb were tested using this configuration.

Example 3

The following compared Pd—Sb alloys prepared as described herein to certain existing Pd—Ni alloys.

Pd—Sb alloys were coated onto copper alloy substrate connector pins to various thicknesses and with a Sb content of 30 at %. Pins were exposed to various voltages and time durations to measure the performance response compared to existing commercial alloys as shown below in Table 3.

TABLE 3

| Alloy | Thickness | Alloy content (wt %) | Voltage (V) | Time (minutes) | Result |
|---|---|---|---|---|---|
| Pd—Ni | 2 | 20 | 3 | 20 | fail |
| Pd—Sb | 2.9 | 27 | 3 | 20 | pass |
| Pd—Sb | 2.9 | 27 | 9 | 20 | pass |
| Pd—Sb | 2.9 | 27 | 15.5 | 4 | pass |
| Pd—Sb | 2.9 | 27 | 15.5 | 5 | fail |
| Pd—Sb | 3.8 | 27 | 15.5 | 7 | pass |
| Pd—Sb | 3.8 | 27 | 15.5 | 8 | fail |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office annual of Patent Examining Procedures, Section 2111.

What is claimed is:

1. An article comprising:
a substrate; and
a layer over the substrate;
wherein the layer comprises a nanocrystalline palladium-antimony alloy, wherein the concentration of antimony is between 25-35 weight percent of the alloy.

2. The article of claim 1,
wherein a low-level contact resistance of the article is no greater than 10 mOhm.

3. The article of claim 1, comprising a second layer.

4. The article of claim 3, wherein the second layer comprises Au and/or Pd.

5. The article of claim 1, comprising a third layer.

6. The article of claim 5, wherein the third layer comprises rhodium metal.

7. The article of claim 1, wherein the substrate comprises copper.

8. The article of claim 1, wherein the nanocrystalline palladium-antimony alloy comprises a hardness of at least 600 HV.

9. The article of claim 1, wherein the nanocrystalline palladium-antimony alloy comprises a crystallite size no greater than 12 nm.

10. The article of claim 1, wherein the nanocrystalline palladium-antimony alloy comprises a crystallite size of at least 5 nm.

* * * * *